INVENTORS.
FRANK Z. KEISTER,
ROBERT S. CONGLETON,
BY
AGENT.

United States Patent Office 3,363,998
Patented Jan. 16, 1968

3,363,998
LASER APPARATUS HAVING A LAYER OF SILVER AND A LAYER OF SILICON MONOXIDE
Frank Z. Keister, Culver City, and Robert S. Congleton, Woodland Hills, Calif., assignors to Hughes Aircraft Company, Culver City, Calif., a corporation of Delaware
Filed Mar. 16, 1964, Ser. No. 351,987
5 Claims. (Cl. 29—183.5)

ABSTRACT OF THE DISCLOSURE

A laser pumping cavity structure having a highly reflective cavity surface of a metal such as aluminum, copper, nickel, etc., coated with silver, in turn coated with a protective nonabsorbing dielectric film. Alternatively, chromium may be deposited on the cavity surface ahead of the silver or, as a further alternative, chromium and a co-deposited layer of chromium and silver may be deposited on the cavity surface ahead of the silver.

---

Figure 1:
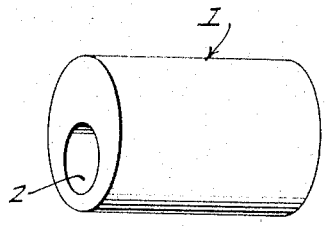

This invention relates generally to highly reflective laser pumping cavities and to methods of making such cavities.

A laser requires a highly reflective pumping cavity to efficiently couple the output of the flash tube or other source of radiant energy from the source to the laser element such as a ruby crystal.

Laser pumping cavities have been fabricated of a variety of materials which are suitable to the laser pumping cavity environment, which are capable of being shaped to provide an internal cavity having a desired configuration and which are additionally suitable to be provided with, or to have formed thereon, a cavity surface having the desired degree of reflectivity to permit and support laser action. Probably one of the more common materials presently employed in the fabrication of laser cells is aluminum. Aluminum is easily worked and may be shaped and polished to a geometrically accurate, highly lustrous surface finish having high reflectivity, to function as a reflector or to function as a base for receiving a selected reflecting material such as silver, or to receive still another base material such as chromium on which a material having high reflectivity is to be disposed. While these and other materials provide desirable reflecting surfaces they tend to be unstable in the laser environment, being degraded, for instance, by exposure to the high intensity radiation of the flash tube, such as the Xenon flash tube used for laser pumping.

One object of this invention is to provide a laser cell having an improved cavity reflecting surface.

Further to the preceding object, it is an object hereof to provide an improved reflector cavity protective surface in a laser cell which has low absorption, which tends to become less absorbing in the presence of ultraviolet radiation and which is relatively inert in laser cavity environments.

A specific object of this invention is to provide a laser cell havng a metal-dielectric reflector cavity comprised of a metal having a high index of reflectivity and at least one layer of a low absorptivity dielectric material.

A further object of this invention is to provide a method for fabricating a laser pumping cavity having an improved reflecting cavity.

More particularly with respect to the preceding object it is an object hereof to provide an improved method for vacuum depositing materials over a surface or surfaces defining a laser cavity.

The aforesaid and other objects and advantages are achieved, according to one aspect of this invention, in a laser pumping cavity having a cavity provided with a reflecting surface. The pumping cavity may be formed of aluminum, brass, glass or any other material which can be machined or formed to the desired geometrical shape and which will accept a high degree of polish or smoothness. Silver is deposited either on the cavity surface or on some other material on the cavity surface to which the silver will adhere by vacuum deposition to provide a geometrically true and highly reflective cavity surface.

Environmental degradation of the silver surface is minimized or substantially obviated in the disposition of a selected one of low absorption, transparent, dielectric material over the reflecting silver surface of the cavity to protect the surface from environmental degradation. Inasmuch as the cavity presents a silver front surface functioning as a reflector, such dielectric materials must exhibit a minimum of absorption of light energy but yet function to protect the reflecting surface from any form of degradation detrimental to operation. In this respect metal-dielectric layers comprising combinations of silver and silicon monoxide (Ag+SiO) have been found to produce protected cavity reflectors having statisfactory levels of reflectivity and environmental durability. In general, it has been found that the addition of a non-absorbing dielectric film to a metallic silver reflecting surface maintains reflectivity and at the same time provides a durable protective coating in laser cavity environments and which, further, in some cases in the presence of ultraviolet flash tube radiation becomes less absorbing of light energy, providing improvements in cavity reflectivity after repeated exposure to flash tube radiation.

According to another aspect of this invention, the fabrication of laser pumping cavities, the reflecting surfaces of which are coated with protective low absorptivity dielectric films, or having cavities coated with materials having reflective surfaces which are protected with dielectric materials, is achievable by means of a method employing the deposition of materials by the process of evaporation. Such processes are normally conducted in a vacuum in which the surface to be coated is exposed to a specific material at an evaporation source. Such processes normally require substantially uniform access of the evaporated material to the surface to be coated. Inasmuch as the cavity of the laser pumping cavity presents a continuous interior surface, that is, usually a suitably shaped surface of revolution or other closed surface, the requirement for substantially uniform access to the surface to be coated without overheating the substrate presents a problem. This has been solved according to the present invention by providing segments to form the laser pumping cavity, either by sectioning after forming as a single-piece pumping cavity, or by fabrication in several segments initially. The cavity faces may now be exposed to the evaporation source for coating by vacuum deposition.

Improvements in reflectivity of reflecting surfaces is achieved in provisions in the process of depositing of selected materials for controlling the rate at which deposition takes place and for controlling the thickness. In general, the higher the rate of deposition of the evaporated reflecting material, the higher the reflectance will be, primarily due to the fact that oxidation is minimized.

Figure 2:
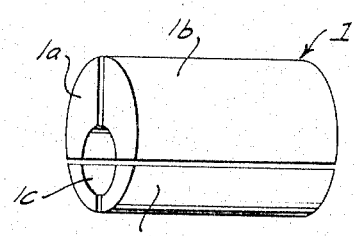
Figure 3:
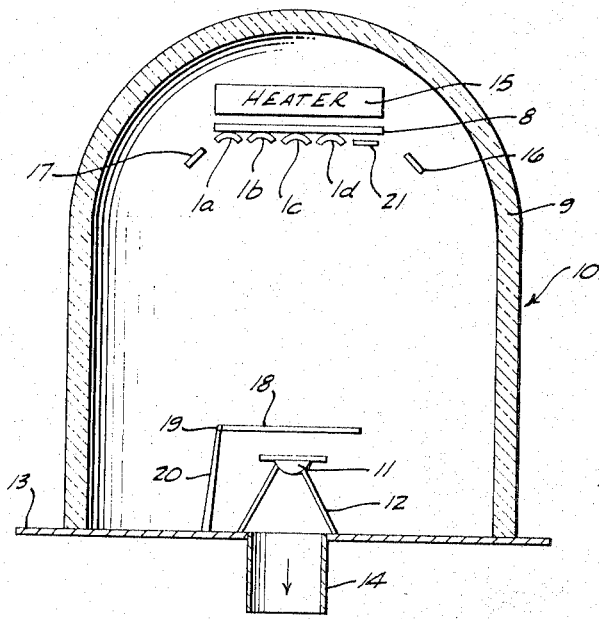

Other objects and advantages will become apparent from a study of the following specification when considered in conjunction with the accompanying drawings in which:

FIG. 1 illustrates a typical laser pumping cavity;
FIG. 2 illustrates a laser pumping cavity comprising four segments;
FIG. 3 schematically illustrates a typical vacuum deposition system illustrating one aspect of this invention; and FIGS. 4 and 5 are fragmentary cross-sectional views of a laser pumping cavity showing the construction of the improved multi-layer cavity reflectors.

FIG. 1 illustrates a typical laser pumping cavity 1 which is of generally cylindrical configuration and which is provided with a cavity 2, also of cylindrical configuration, extending axially therethrough and opening through the end faces of the pumping cavity. Such a pumping cavity may be formed of any suitable material compatible with the laser pumping cavity environment and requirements. For the purposes of this discussion aluminum will be referred to as the material from which the laser pumping cavity is formed. This is one of the more frequently employed materials for this purpose. To this end the pumping cavity 1 may be a solid bar of aluminum having a cavity opening therethrough of approximately 1⅜ inches in diameter. The cavity surface is accurately machined and highly polished to provide a highly finished, geometrically accurate reflecting surface. In the past this polished cavity surface has been employed as the reflector surface for the laser pumping. Although aluminum has relatively high reflectivity and, if carefully finished, can be used for this purpose, the reflectivity diminishes rapidly with use in the laser environment. As reflectivity diminishes the efficiency of the laser drops off markedly, increasing the threshold for laser action and increasing the amount of pumping energy required to achieve laser action.

Efforts to overcome this type of problem have resulted in experimenting with different types of reflecting surfaces in the laser cavities. In this respect silver has been found to be a good reflector and to have a longer life expectancy in the laser pumping cavity environment than aluminum, for instance, but here again deterioration after limited use in the laser cavity environment results in lowering efficiency. Continuing experiment has resulted in the use of low absorption dielectric materials over the reflecting metal surfaces. These experiments have covered multi-dielectric layers as well as single dielectric layers. Some of the multi-dielectric layer arrangements have indicated promise showing reflectivities of in the range of 96% to 97% for wavelengths of 4000 to 6000 A. One such multilayer reflector involved highly polished aluminum as the reflecting material and one-quarter wavelength thickness deposits of silicon monoxide SiO and titanium dioxide $TiO_2$. Here, again, the life expectancy was too short, even though initial high reflectivities were indicated. Continued experiments resulted in a combination of silver and silicon monoxide $Ag+SiO$ as a multilayer reflector which produced high reflectivity and which exhibited stability in the laser cavity environment beyond any other of the multilayer combinations that had been previously developed.

Figure 4:
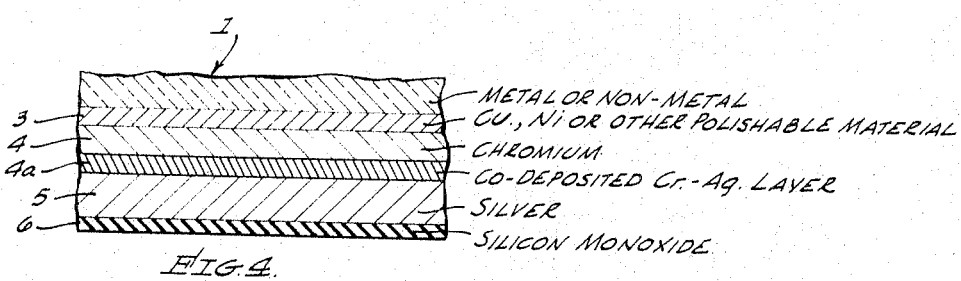
Figure 5:
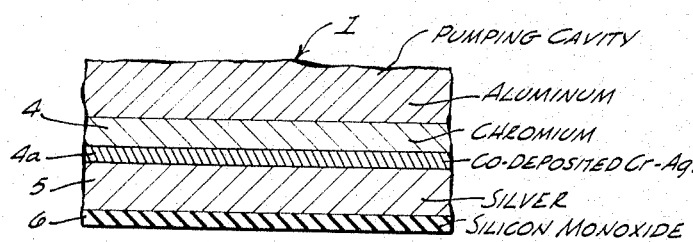

With respect to the silver and silicon monoxide reflector, reference may be made to FIGS. 4 and 5. In FIG. 4 there is illustrated a fragmentary section of the pumping cavity, generally designated 1, which may be some other substrate than aluminum, including nonmetallic materials. This represents a section of the laser cell.

If the material from which the cavity is formed cannot be polished to the required degree of smoothness, a layer of some metal such as nickel or copper may be deposited chemically or electro-chemically. These and other metals having similar properties may be polished to a high surface finish, thereby forming an acceptable surface for the deposition of the succeeding layer.

Next follow a layer 4 of chromium, a co-deposited layer of chromium and silver, a layer 5 of silver and a layer 6 of silicon monoxide. The layer 3 provides a satisfactory base material over the substrate material permitting forming of a geometrically accurate and highly reflective surface. Chromium or nickel-chromium is next deposited over the layer 3 to provide a layer to which the subsequent silver layer will adhere. The silver layer is next applied over the chromium and is finished to a high lustre, again of geometrically accurate configuration, after which silicon monoxide is deposited to complete the multilayer reflector and to provide a protective coating for the silver surface.

In FIG. 5 the substrate material of the laser pumping cavity is assumed to be aluminum. After polishing of the cavity surface the sequence of deposition of chromium, co-deposited chromium and silver, silver and silicon monoxide follows as in connection with FIG. 4.

Although chromium has been indicated as a material desirably applied over the substrate, it is to be understood that other materials, such as commercially available nickel chromium alloys affording somewhat similar properties, may be employed.

Laser pumping cavities utilizing the multilayer reflector construction described herein, and particularly employing the silver-silicon monoxide reflector layer construction have been tested and have shown drastic decreases in the threshold value for laser action, together with a general increase in laser efficiency when compared to polished aluminum surfaces and have shown a substantial decrease in the threshold of laser action, together with an increase in laser efficiency when compared to vacuum deposited aluminum surfaces overcoated with silicon monoxide. Measurements of samples which have been repeatedly exposed a large number of times to flash tube radiation during laser pumping have shown no appreciable decrease in reflectivity as has been noted for unprotected silver reflectors, unprotected aluminum reflectors, aluminum reflectors protected with either silicon monoxide or titanium dioxide, or both, and others. Additionally, it has been observed that absorption of high intensity ultraviolet from the flash tube radiation causes the silicon monoxide coating to become less absorbing and thus yielding in some cases an increase in reflectivity after repeated exposure to flash tube radiation. In this respect it is believed that the decrease in absorption may be the result of formation of silicon dioxide $SiO_2$, $Si_2O_3$, or other $SiO_x$ structure in the dielectric coating.

The techniques for fabricating laser pumping cavities of the type herein described are based upon the vacuum deposition of thin films of selected reflective and dielectric materials of the type described hereinabove, although the silver layer may be a layer of silver foil or may be a layer of electro-deposited silver. In general, the descriptive disclosure which follows, directed to the method of making the improved laser pumping cavity, will be directed to procedures involving an aluminum pumping cavity having a highly reflective geometrically accurate cavity, the surface of which forms a substrate for the deposition of the named materials. In these discussions it will be appreciated that the function of the thin film or bulk layer of silver is to provide high reflectivity and the function of the silicon monoxide film is to protect the silver surface from dust and other contaminants and to prevent oxide formation or other unwanted reactions, particularly in the laser environment, which might decrease or degrade reflectivity.

Conventional practices in the preparation of thin films by the process of vacuum deposition involves the use of a suitable chamber communicating with a vacuum pump capable of pumping the chamber down to a particularly desired low pressure. The chamber includes an evaporation source which comprises the material which is to be evaporated to form the thin film. Such a source is usually heated electrically in such a way as to provide a controlled input of electrical energy to provide rates of evaporation necessary to achieve desired rates of deposition of the material on the particular substrate or other surface to which it is to be applied. In vacuum deposition processes, it is necessary that the products of evaporation have substantially uniform access to the surface to be coated. In laser pumping cavities of the general size described herein, having a cavity of about 1⅜ inches in diameter this presents a problem since while conceivably a source may be positioned in a position substantially centrally and extending axially of a cavity, such as the cavity 2 in the laser pumping cavity, the proximity of the hot source to the cavity walls results in undesirable heating of the substrate material, interfering with satisfactory coating or deposition of materials on the cavity surface.

The present invention overcome this problem by providing a laser pumping cavity which is fabricated of segments. An arrangement of this type may be formed of individual segments which are precisely fabricated or the pumping cavity may be made as a single piece, as illustrated in FIG. 1, and thereafter carefully sectioned to provide the cylindrical segments 1a through 1d, as illustrated in FIG. 2. The cylindrical segments comprising the laser pumping cavity, as will be seen in FIG. 3, are supported beneath a substrate holder 8 disposed within a casing 9 forming part of a vacuum deposition system, generally designated 10. Such a casing 9 may be of stainless steel or glass. The substrates 1a through 1d are suspended with their cavity faces directed downwardly, pointing in the direction of an evaporation source 11 on electrodes 12 above a base plate 13 of the assembly. The interior volume communicates through a conduit 14 with a suitable vacuum pumping system, not shown, so that the interior volume may be lowered in pressure to that necessary for satisfactory evaporation and deposition of the source material. Immediately above the substrate support 8 is a heater, generally designated 15. This is preferably an electrical heater which may be carefully controlled to provide precise substrate temperatures to achieve optimum coating of the substrate during the vacuum evporation process. Facilities may be provided for monitoring both the evaporation rate by means of a rate monitor 16 and for montoring the thickness by means of a thickness monitor 17 which are coupled to suitable instrumentalities, not shown, for the purpose of providing information necessary in adjusting the control of the evaporation source 11 and/or the substrate heater 15. The vacuum evaporation system includes additionally a shutter 18 which extends over the evaporation source 11 and which may be pivoted about a fixed pivot 19 at the upper end of the support 20 projecting upwardly from the base plate 13. When the shutter 18 is removed the substrates are exposed to the evaporation source 11. Vacuum evaporation systems having rate and thickness monitoring controls are described in co-pending applications Serial No. 249,044, now Patent No. 3,297,944, issued Jan. 10, 1967, entitled "Rate Monitoring System for Vacuum Evaporation Process," inventors Paul Nektaredes and R. Y. Scapple, filed Jan. 2, 1963, and Ser. No. 227,-228 (abandoned Mar. 14, 1966) entitled "Film Thickness Monitoring System," inventors R. B. Feuchtbaum and R. Y. Scapple, both applications being assigned to the assignee of this invention.

In evaporation processes the uniform application of the evaporated material as a coating over a substrate requires substantially uniform access of the evaporated material to the substrate surface. Preferably, the substrate surface will be approximately normal to a line from the substrate to the evaporation source. This idealized arrangement is not completely available in this situation in view of the arcuate configuration of the cavity surfaces but is approximated to a sufficient degree to permit adequate and satisfactory coating, particularly when it is realized that migration of the products of evaporation from the source to the substrate surfaces involves some random motion of the products of evaporation.

In the process of fabrication of one specific laser pumping cavity, silver wire, chromium powder and silicon monoxide were employed as the evaporation materials.

Chromium powder which was about 99% plus pure and which is commercially available was placed in a tungsten boat from which it was evaporated by electrical heating. The tungsten boat is also a commercially available item usable in such processes.

Silver wire which was about 99.9% pure and approximately 0.020 inches in diameter was evaporated from a double molybdenum boat which was electrically heated. Such boats are also commercially available, as is the silver wire.

The silicon monoxide was a commercially available +10 mesh, vacuum baked product. It was evaporated from a tantalum chimney source which is also commercially available.

The silver, chromium and silicon monoxide evaporation were done in a conventional vacuum coater with a stainless steel bell jar.

Thickness measurements of the thin films were made by multiple beam interferometric techniques.

In practicing the process the four laser pumping cavity segments 1a through 1d were mounted in the vacuum chamber beneath the substrate holder 8, as indicated, at a distance of about 12 inches above the evaporation source 11. A small aluminum disc 21 is also mounted beneath the substrate holder 8 at one side of the segments, for example, adjacent the segment 1d to act as a control specimen for reflectivity measurements.

In the deposition of the chromium and siliver the substrates were positioned about 10 inches from the evaporation source 11. In this instance two evaporation sources, one chromium and one siliver, were employed. Chromium was first evaporated on the substrate to a thickness of about 400 A. At this time the silver was gradually phased into the evaporation stream by heating the silver evaporation source, thus yielding a chromium and silver co-deposited layer. After about 30 seconds of deposition of the co-deposited layer the chromium evaporation was stopped and the evaporation of the silver continued on the substrates to a silver layer thickness of about 750 A. at a rate of approximately 13 A. per second. Chromium and silver are evaporated together for a period of about 30 seconds while the rate of evaporation of the chromium is being reduced to zero and the rate of evaporation of the silver is being increased. Throughout this operation the vacuum was maintained at about $1.5 \times 10^{-4}$ torr and the substrate temperature was maintained at about 112° C. In general, the faster the silver is deposited the better will be the deposited silver layer since oxidation is minimized.

The silicon monoxide was next evaporated; the tentalum chimney source containing the silicon monoxide now constitutes the evaporation source. The laser pumping cavity segments were disposed at a distance of about 10 inches from this source. Silicon monoxide was evaporated so as to provide a deposition rate of from 11 A. per second to 13 A. per second to a thickness of about 450 A.±50 A. During this process the vacuum was maintained at $5 \times 10^{-5}$ to $3 \times 10^{-5}$ torr and the substrate temperature was maintained at about 70° C. In general, the rate of deposition of the silicon oxide may be lower than for the reflecting materials. Also the pressure in which evaporation is taken may be higher since exposure to some oxygen is not objectionable.

Although the specific procedure for fabricating the improved laser pumping cavity as outlined hereinabove is directed primarily to a pumping cavity fabricated of aluminum and is directed to a specific multilayer reflector involving chromium, it will be appreciated by those skilled in the art that the process may be practiced without the use of a chromium coat or layer. Again, with reference to FIG. 5, and with respect to the process outlined hereinabove, when a pumping cavity comprised of aluminum is employed the chromium may be deposited directly on the substrate cavity surface or, alternatively, only a silver and silicon monoxide reflector may be deposited on such an aluminum substrate. In the extreme, silicon monoxide alone may be deposited over the cavity surfaces to provide protection for the aluminum surface.

These and other variations will be apparent to those skilled in the art.

Inasmuch as material thickness must be fairly accurately controlled, and since the range of thickness of the several layers is generally below that which may be satisfactorily monitored by many available monitoring controls, a method was devised whereby the evaporation sources could be operated at particular evaporation rates for specific periods of time to achieve thickness of the layers as required. To this end, statistical data was accumulated on the various evaporation sources by operating each source in its environment and depositing the evaporated material upon test pieces supported in the vacuum chamber. By noting the energy level of the input to the evaporation source, the time of its operation and the thickness of the material deposited, it was possible to select particular energy inputs to achieve evaporation source operation providing desired rates of deposition. Thus, by timing the evaporation operation layer thicknesses controlled to within ±25 A. were obtainable.

What is claimed is:

1. A laser pumping cavity structure comprising: a body structure including a metal portion having a highly reflective metal surface therein defining a cavity; a layer of silver disposed on said surface; and a layer of silicon monoxide disposed on said layer of silver.

2. A laser pumping cavity structure comprising: a body structure including a metal portion having a layer of chromium providing a highly reflective surface defining a cavity; a layer of silver disposed on said layer of chromium; and a layer of silicon monoxide disposed on said layer of silver.

3. Apparatus as set forth in claim 2 in which said layer of chromium is about 400 A. in thickness and the combined thickness of said layer of chromium and layer of silver is about 1200 A.

4. Apparatus as set forth in claim 2 in which chromium and silver are intermixed in changing amounts in the region between the layer of chromium and the layer of silver.

5. Apparatus as set forth in claim 2 in which the thickness of said layer of silicon monoxide is about 450 A.

References Cited

UNITED STATES PATENTS

| | | | |
|---|---|---|---|
| 2,539,246 | 1/1951 | Hensel | 29—197 |
| 3,274,024 | 9/1966 | Hill | 117—215 |

HYLAND BIZOT, *Primary Examiner.*